US006690003B2

(12) United States Patent
Żak

(10) Patent No.: US 6,690,003 B2
(45) Date of Patent: Feb. 10, 2004

(54) LASER ACTUATED REMOTE OPERATOR

(76) Inventor: Artur Żak, 3870 Cedarvale Rd., Syracuse, NY (US) 13215

( * ) Notice: Subject to any disclaimer, the term of this patent is extended or adjusted under 35 U.S.C. 154(b) by 0 days.

(21) Appl. No.: 10/106,400

(22) Filed: Mar. 25, 2002

(65) Prior Publication Data

US 2003/0178554 A1 Sep. 25, 2003

(51) Int. Cl.[7] ................................................. G06M 7/00
(52) U.S. Cl. ...................................... 250/221; 359/142
(58) Field of Search ............................. 250/221, 214 D, 250/214 SW; 359/142, 147, 159, 168, 170

(56) References Cited

U.S. PATENT DOCUMENTS

| 3,710,122 A | * | 1/1973 | Burcher et al. ............. 359/132 |
| 4,219,288 A | * | 8/1980 | Gordemer et al. ............ 406/28 |
| 5,541,695 A | * | 7/1996 | Teremy et al. ................ 396/59 |
| 5,719,622 A | * | 2/1998 | Conway ................... 348/211.8 |
| 6,055,079 A | * | 4/2000 | Hagans et al. ............... 359/147 |

* cited by examiner

Primary Examiner—Kevin Pyo
Assistant Examiner—Seung C. Sohn
(74) Attorney, Agent, or Firm—Bernhard P. Molldrem, Jr.

(57) ABSTRACT

A remote operator includes a laser-actuated photo switch. A hand held laser sweeps past an active or sensitive area on the unit to cause the unit to change states, e.g., between "on" and "off." In a lamp dimmer implementation, pointing the laser at the unit can cause it to increment (between dim and bright, fast and slow, soft and loud, etc.). The laser produces a narrow beam of laser light at a single characteristic wavelength. A dark filter or other optical filter can be disposed over the optical sensor element for passing only light at the laser's characteristic wavelength. A monostable, bistable or other multivibrator unit can be employed to effect toggling or a timed on (or timed off) operation. The remote operator can be integrated into the housing or body of the load device, e.g., into a ceiling fan, wall switch, table lamp, or any other device in need of remote controlled operation.

15 Claims, 3 Drawing Sheets

LASER ACTUATED REMOTE OPERATOR

BACKGROUND OF THE INVENTION

The present invention relates to a remotely actuated switches and control devices, e.g., for turning an electric appliance on or off, or for changing its speed or other operating condition.

Among present available remote operators, and typically found in households, are infrared units. These remote operators are mainly used in connection with video or audio electronics for controlling selection, volume, and other functions. Because of the variety of the functions that need to be controlled, the infrared unit employs a code modulation technique, with a sequence of blinking signals to control the respective functions. The infrared signal is generated by an IR LED in a hand-held remote unit, and is received by a sensor installed in the television, VCR, stereo, CD player, or the like. Every specific function of the infrared operator requires a separate, distinctive code. Different electronics units require a different set of codes for the same function, because the same hand held remote operator is going to emit light that is visible to all the controlled devices at the same time. Because the LED emits light over a broad area, the light disperses rapidly. This means that the unit will function even if not pointed at the receiver, and can function from IR signals that bounce off walls or ceilings. However, this limits the range of the remote operator to only about 20 or 30 feet.

Another form of remote operator currently in use is a radio-frequency (RF) operator. This kind of remote operation is especially useful when the controlled device is not on a line of sight, or is located inside a different space or building. This system also requires specific codes and often requires specific frequencies for different functions. These RF units are also susceptible to RF interference, and jamming. A high volume of RF traffic, as well as high amounts of electrical activity, for example in industrial spaces, can render these remote operators rather unreliable. Moreover, because the remote operator emits more or less omnidirectionally, the range can also be rather limited.

Acoustic remote operators are also in use, but have found limited practical applicability. An example of this is a "clap-hands" switch. These operators are subject to false activation, and are also of limited value where reliability is needed. Other remote operators can employ a presence detection system.

A need exists for a remote operator which is highly reliable and simple to use, and which has a strictly local character. There is also a need for a remote operator of general or universal operation, and which does not require special codes for each controlled unit. It is also desired for the remote operator to be free from problems that may arise from RF interference or other interference, and can be used for even simple "on"—"off" applications for devices in close proximity to one another. There is a need for such a remote operator that can operate at some distance from the controlled device.

OBJECTS AND SUMMARY OF THE INVENTION

It is an object to provide a remote operator that is simple and reliable, and which avoids the drawbacks of the prior art.

It is another object to provide remote operator that can be employed in a variety of noisy and RF rich environments, and which is not subject to false actuation due to stray radiation or from high levels of ambient radiation.

In accordance with an aspect of this invention, the remote operator can take the form of a laser-actuated photo switch, in which a hand held laser sweeps past an active or sensitive area on the unit to cause the unit to change states, e.g., between "on" and "off." In more advanced embodiments, pointing the laser at the photosensitive position of the unit can cause it to increment (between dim and bright, fast and slow, soft and loud, etc.), or the unit can turn the device on for a timed period, after which it automatically shuts off. It is envisioned that the hand held laser produce a narrow beam of laser light at a single predetermined wavelength. However, in some applications, it may be useful to employ a laser beam of two or more discrete wavelengths In any of several preferred embodiments, the remote operator permits hands-off switching of an electric load device in response to a sweep of a laser beam over a sensor portion of the remote operator. An optical sensor element is sensitive to a predetermined wavelength characteristic of the laser beam, and a relay device (which can be an electromechanical relay or an electronic switching element) follows the optical sensor element and is actuated by it. There is wiring connecting the optical sensor element and the relay device with a source of electrical power (AC line power, or battery power, for example), and also wiring connecting the relay with load device. A dark filter or other optical filter can be disposed over the optical sensor element for passing only light at the laser's characteristic wavelength. This ensures that the ambient light or other reflected or direct light will not cause false switching.

A monostable, bistable or other multivibrator unit can be employed to effect toggling or a timed on (or timed off) operation.

The remote operator can be integrated into the housing or body of the load device, e.g., into a ceiling fan, wall switch, table lamp, or any other device in need of remote controlled operation.

The above and many other advantages and features of this invention will become apparent from the ensuing description of selected preferred embodiments of the invention.

DETAILED DESCRIPTION OF THE PREFERRED EMBODIMENT(S)

Figure 1:
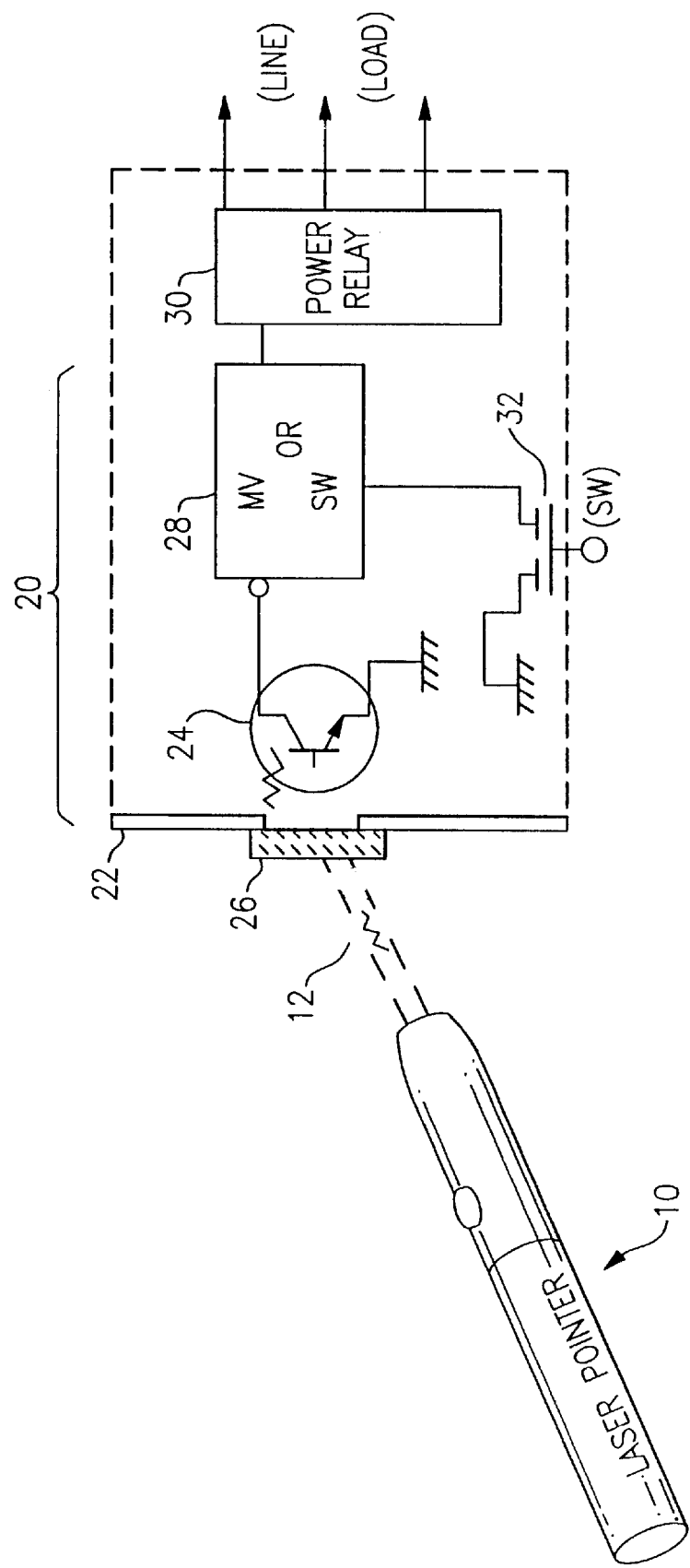
FIG. 1 is a schematic circuit diagram of an embodiment of a remote operator according to one embodiment of this invention.

With reference to the Drawing, and initially to FIG. 1 thereof, a hand-held laser device, e.g., a laser pointer 10 is configured to emit a narrow beam 12 of a predetermined laser wavelength, e.g., visible red at about 670 nm, with a spot size that is only one or two millimeters across at the distance from one size of a room to the other. In some embodiment, the laser 10 can emit a beam of a different wavelength, which can be outside the visible spectrum, e.g., infrared. In other embodiments, the light can be at two discrete wavelengths.

A remote operator 20 according to one embodiment of this invention, namely, a laser-actuated switch, is shown to be contained within a housing or enclosure 22. A photosensor 24, which may include a phototransistor, is sensitive to the particular wavelength(s) that characterize the laser beam 12, and preferably there is a dark filter 26, i.e., a pass band filter, that admits only that or those specific wavelength(s), and shields the photosensor 24 from stray ambient radiation so there is no false triggering. A switch actuator circuit 28, which may include a multi-vibrator circuit is actuated or triggered by the photosensor 24, and itself has an output connected to a power relay circuit 30. The power relay 30 can be one or more electromechanical relays, or can include a triac-based electronic relay circuit, for example. In this embodiment, the switch actuator circuit is a toggle-type flip flop, which changes state (i.e., between "on" and "off") each time it receives a signal from the photosensor 24. A simple filter, an input delay circuit or an anti-chatter circuit (not shown) can prevent unwanted multiple actuations. A monostable multivibrator can be used to achieve a timed ON actuation, at the end of which the load device is automatically switched OFF. This can also be used for a timed OFF or timed interrupt.

As shown here, the power relay circuit 30 has conductors going to the AC line power source, and conductors going to the load device that is to be switched on and off.

A manual override switch 32 is coupled to the switch actuator circuit to permit actuation without the use of the laser device 10, when desired.

Figure 2:
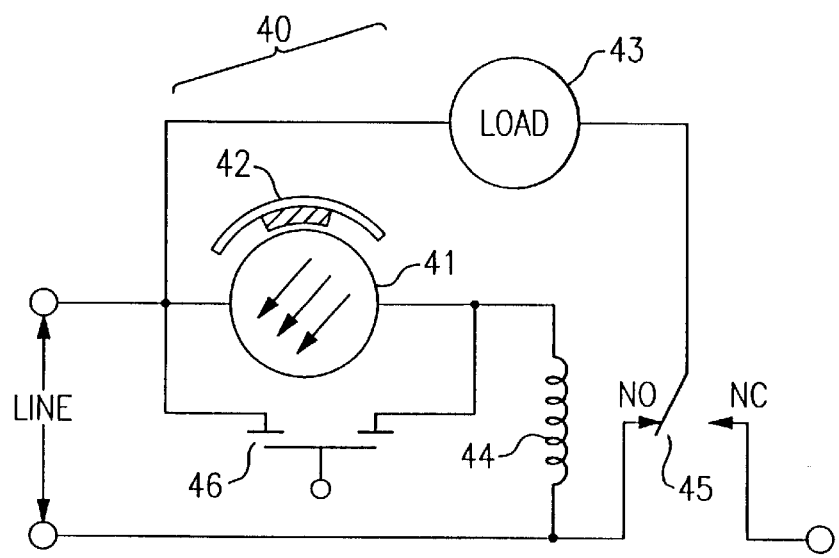
FIG. 2 is a schematic circuit diagram of another embodiment of this invention.

Another rather simple embodiment of a remote operator 40 of this invention is shown in FIG. 2. Here, within the housing or enclosure (not shown) there is a photodetector 41, with an associated optical filter 42, and a load device 43, which may be a power outlet into which a lamp, motor, or other electrical device may be coupled, i.e., with a usual power cord set and plug. A relay has its relay actuator coil 44 powered by the photodetector 41, and has a pair of contacts 45, one set of which (here, the normally open or NO contacts) connects between AC line and the load device 43. In other embodiments, the NC contacts could be used. Also, a manual override switch 46 is shown here bridging in parallel with the photodetector 41. Latching means would be understood to be associated with the relay contacts 45 and actuator coil 44, and are not illustrated here.

Here the optical filter 42 is shown to be a convex spherical member, with a translucent core, so that the laser light will reach the photodetector 41 even if the laser beam is incident at a significant angle.

Figure 3:
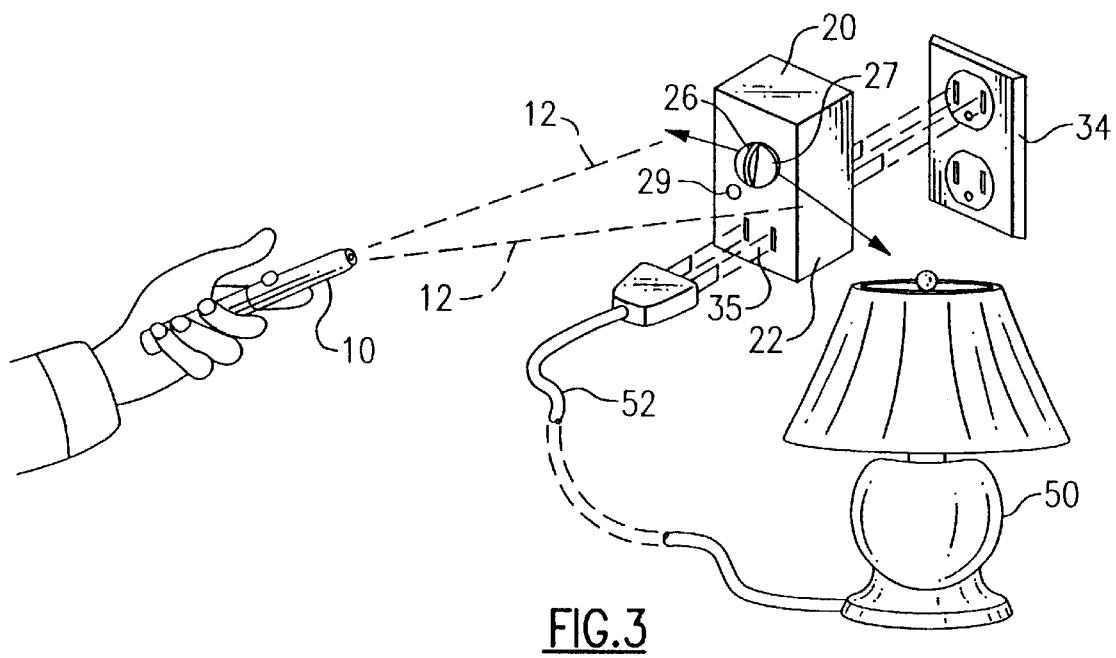
FIG. 3 is a perspective view of one implementation of an embodiment of the invention.

An implementation of the remote actuator of this invention is shown in FIG. 3. The remote actuator 20 can take the form of a lamp control module, which may be plugged into a standard AC wall outlet 34. A standard table lamp 50 is shown here with a lamp cord and plug that fits into a female outlet 35 on the housing 22 of the remote actuator 20. The user simply picks up the laser pointer 10 and points it at the remote actuator module. The beam 12 sweeps across the filter 26, and the laser wavelengths penetrate and are picked up by the photosensor inside the unit. This controls power to the lamp 50, e.g., to turn it on or off. Not shown here is a push button switch on the housing 22 of the module, that permits manual actuation to turn the lamp on or off. Here, there is a convex spherical cover 27 over the filter 26 to give the unit omnidirectional reception coverage. There is also a small LED 29, which is always on and serves as an aiming light, and helps the user quickly locate the direction to point the laser 10.

Figure 4:
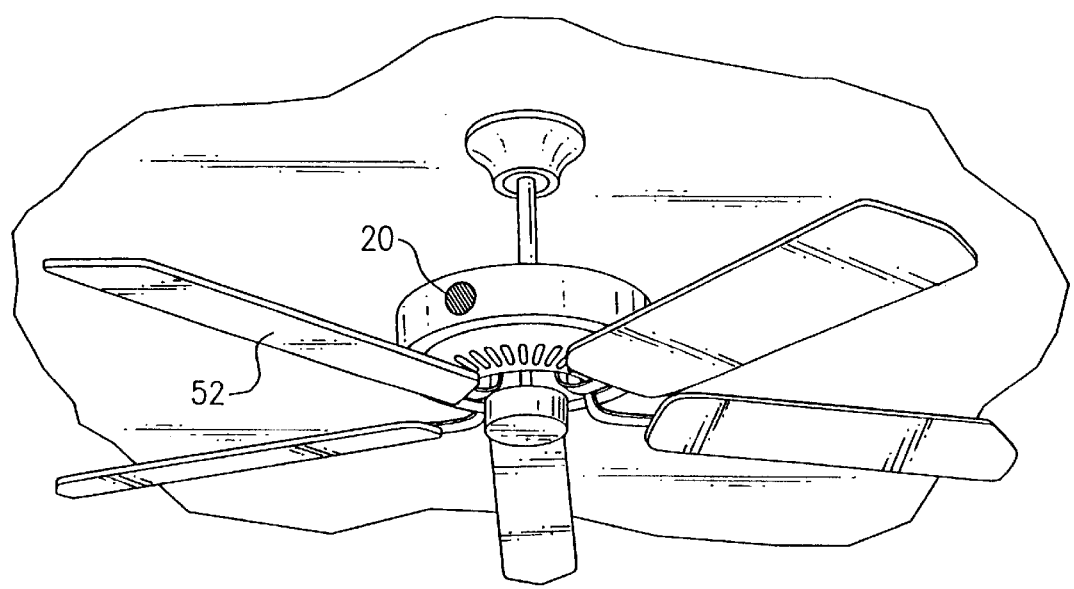
FIGS. 4, 5, and 6 are perspective views of embodiments of the invention in a ceiling fan, touch-dimmer wall switch, and high-power control, respectively.
Figure 5:
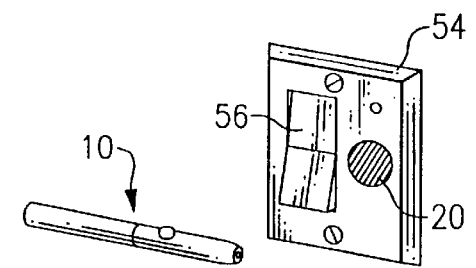
Figure 6:
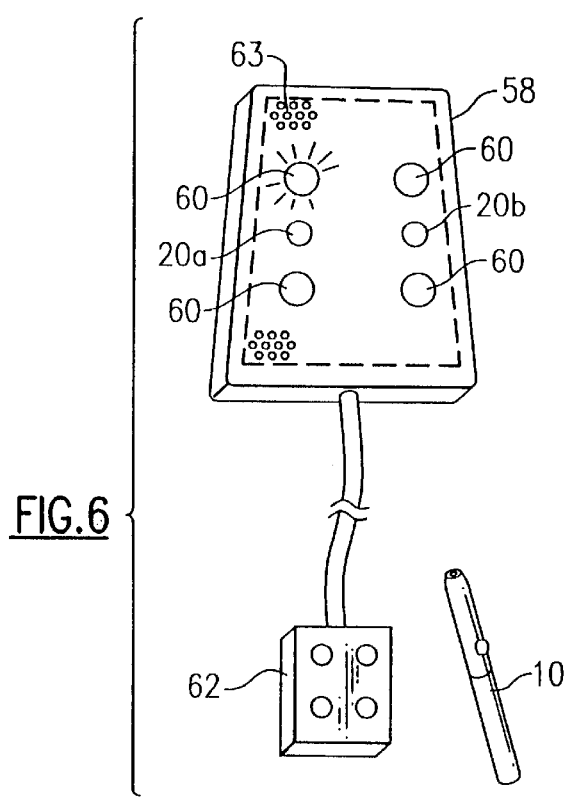

Many implementations of this invention will be apparent to persons working in this field, but a few rather straightforward applications of the remote operator of this invention are shown in FIGS. 4, 5, and 6.

As shown in FIG. 4, a ceiling fan 52 may have the remote operator 20 incorporated in its motor housing (or elsewhere) and permits the user to control the fan speed by use of the hand held laser, from some distance from the fan. This implementation may be of great value to bedridden patients or disabled persons, who may not be able to reach the usual pull-chain fan control or wall-switch fan controls. This may also have an aiming light LED or lamp located at or near the position of the remote operator.

A touch-dimmer wall switch arrangement 54 is shown in FIG. 5. Here there is a touch plate 56 which increments the brightness of an associated lamp up or down each time the user touches the plate, or gradually changes the brightness of the lamp if the user holds his or her finger on the plate 56. In this implementation, the remote operator 20 is situated in the wall switch arrangement 54 alongside the touch plate 56. In this arrangement, the user can dim the room lights by picking up the hand-held laser pointer 10, and hitting the laser sensitive remote operator 20 with the laser beam. This can be done while seated, e.g., so as not to interrupt dinner or without disturbing an ongoing meeting or class. A remote operator (the same one or an additional one) can be employed to control the ceiling fan lamp.

A high-power ON/OFF power switch 58 is shown in FIG. 6, which is also actuated by means of a hand-held laser pointer device 10. This can be associated with a factory or industrial equipment, such as a large industrial press or fabrication machine. For safety reasons, it may be required for one or more workers to be able to turn the equipment on or off immediately from anywhere on a factory floor, if a safety or other need arises. Here there are a pair of laser actuated remote operators 20a, 20b situated in the housing of the power switch 58, and each has an associated pair of pilot light devices 60, which may include LEDs. One remote operator 20a may be used to turn the equipment on and the other 20b to turn it off. On the other hand, the switch may control two (or more) separate phases of operation of the same equipment, or of different pieces of equipment. Also shown here is a manual control module 62, with manual push buttons, and which may hang below the main power switch 58. This arrangement permits the power switch to be located high above the factory floor, where it can be visible and actuated from the entire floor, if need be.

Also shown here there may be reflective tape 63 (e.g., Scotchlite™) covering at least a significant portion of the front of the power switch housing. This provides a bright reflection of the laser beam 12 visible to the user when the laser beam is properly aimed towards the power switch 58, which assures accurate switch actuation, and makes the switch actuation easier for the user. Instead of reflective tape, any suitable back-reflective coating material may be used.

Because the small spot size of the laser beam has to contact the location of the photo sensor to actuate the remote operator, and because direct illumination rather than diffuse reflected illumination is needed, multiple remote operators and multiple switched devices can be located all within the same environment without their interfering with one another. Moreover, a single laser unit 10 can control a number of remote operators 20, and several persons in the same environment can be equipped with laser units 10 which can be used to control the same remote operator(s) 20.

Other possible implementations are possible, but not all are illustrated here. For example, the remote operator of this invention may be incorporated into a one-way wall switch or a three-way wall switch, or incorporated into a table lamp, or within electronic equipment, e.g., to control the loudness (volume) of a radio, an audio amplifier or a stereo set.

While the invention is described in reference to preferred embodiments, the invention is certainly not limited to those embodiments. Rather, many modifications and variation would present themselves to persons skilled in the art without departing from the scope and spirit of the invention, as defined in the appended claims.

I claim:

1. A remote operator for hands-off switching of an electric load device in response to a sweep of a laser beam of a small hand-held laser device over a sensor portion of the remote operator, comprising an optical sensor element that is sensitive to a predetermined optical wavelength that is characteristic of the light of said laser beam; a relay device following said optical sensor element and actuated by said optical sensor element in response to the presence of said laser beam; wiring means connecting said optical sensor element and said relay device with a source of electrical power; and wiring means connecting said relay device with said load device.

2. Remote operator according to claim 1 further comprising a hand-held laser device generating a laser beam at said characteristic wavelength.

3. Remote operator according to claim 1 further comprising an optical filter disposed over said optical sensor element for passing only light at said predetermined characteristic optical wavelength.

4. Remote operator according to claim 3 wherein said optical filter includes a convex spherical member having a translucent core.

5. Remote operator according to claim 1 wherein said relay device includes a multivibrator circuit with an input actuated by said optical sensor element.

6. Remote operator according to claim 5 wherein said multivibrator toggles between ON and OFF states each time that input of the multivibrator receives a signal from the optical sensor element.

7. Remote operator according to claim 5 wherein said multivibrator is monostable and is actuated by said optical sensor element into a timed ON state for a predetermined period followed by an OFF state, such that said relay device provides electric power to said load device during said predetermined period and then automatically cuts off power thereto after said predetermined period.

8. Remote operator according to claim 1 wherein said load device has a housing, and the remote operator is mounted within the housing of said load device.

9. Remote operator according to claim 8 wherein said load device is a ceiling fan.

10. Remote operator according to claim 1 further comprising a lamp dimmer circuit actuated by said relay device to increment between progressively brighter and dimmer brightness settings.

11. Remote operator according to claim 1 wherein said remote operator is integrated into a wall switch device.

12. Remote operator according to claim 1 further comprising an aiming light which facilitates the user in aiming the laser beam at the remote operator.

13. Remote operator according to claim 1 further comprising a convex translucent cover over said optical sensor for allowing omnidirectional reception of said laser beam.

14. Remote operator according to claim 1 further comprising a manual override switch coupled to the relay device to permit actuation of the load device without use of the laser device.

15. A remote operator for hands-off switching of an electric load device in response to a sweep of a laser beam over a sensor portion of the remote operator, comprising a housing, an optical sensor element within said housing and which is sensitive to a predetermined optical wavelength characteristic of the light of said laser beam; a relay device following said optical sensor element and actuated by said optical sensor element; wiring means connecting said optical sensor element and said relay device with a source of electrical power; wiring means connecting said relay with said load device; and back reflective film coating means on at least a portion of said housing for reflecting the laser beam back to a user of the remote operator.

* * * * *